US011552783B2

United States Patent
Atallah et al.

(10) Patent No.: US 11,552,783 B2
(45) Date of Patent: *Jan. 10, 2023

(54) SYSTEM ARCHITECTURE AND METHOD OF PROCESSING DATA THEREIN

(71) Applicant: Purdue Research Foundation, West Lafayette, IN (US)

(72) Inventors: Mikhail J Atallah, West Lafayette, IN (US); Siva Chaitanya Chaduvula, Lafayette, IN (US); Adam Dachowicz, West Lafayette, IN (US); Jitesh H Panchal, West Lafayette, IN (US); Mohammad S Rahman, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,594

(22) Filed: Jan. 27, 2022

(65) Prior Publication Data
US 2022/0158821 A1 May 19, 2022

Related U.S. Application Data

(63) Continuation of application No. 16/543,495, filed on Aug. 16, 2019, now Pat. No. 11,239,998.
(Continued)

(51) Int. Cl.
*H04L 9/06* (2006.01)
*G06F 17/18* (2006.01)

(52) U.S. Cl.
CPC ............ *H04L 9/0631* (2013.01); *G06F 17/18* (2013.01); *H04L 2209/46* (2013.01)

(58) Field of Classification Search
None
See application file for complete search history.

(56) References Cited

U.S. PATENT DOCUMENTS

| | | | | |
|---|---|---|---|---|
| 2014/0229731 | A1* | 8/2014 | O'Hare | H04L 9/085 713/165 |
| 2015/0363481 | A1* | 12/2015 | Haynes | G06Q 10/10 707/748 |
| 2016/0261409 | A1* | 9/2016 | French | H04L 9/3234 |

\* cited by examiner

*Primary Examiner* — Nelson S. Giddins
(74) *Attorney, Agent, or Firm* — Piroozi-IP, LLC

(57) ABSTRACT

A method of performing ordered statistics between at least two parties is disclosed which includes identifying a first dataset ($x_A$) by a first node (A), identifying a second dataset ($x_B$) by a second node (B), wherein $x_B$ is unknown to A and $x_A$ is unknown to B, and wherein A is in communication with B, and wherein A and B are in communication with a server (S), A and B each additively splitting each member of their respective datasets into corresponding shares, sharing the corresponding shares with one another, arranging the corresponding shares according to a mutually agreed predetermined order into corresponding ordered shares, shuffling the ordered shares into shuffled shares, re-splitting the shuffled shares into re-split shuffled shares, and performing an ordered statistical operation on the re-split shuffled shares, wherein the steps of shuffle and re-split is based on additions, subtractions but not multiplication and division.

20 Claims, 2 Drawing Sheets

Related U.S. Application Data

(60) Provisional application No. 62/719,153, filed on Aug. 17, 2018.

SYSTEM ARCHITECTURE AND METHOD OF PROCESSING DATA THEREIN

CROSS-REFERENCE TO RELATED APPLICATIONS

The present patent application is related to and claims the priority benefit of U.S. Non-provisional patent application Ser. No. 16/543,495 filed Aug. 16, 2019, which is related to and claims the priority benefit of U.S. Provisional Patent Application Ser. No. 62/719,153 filed Aug. 17, 2018, the contents of each of which are hereby incorporated by reference in its entirety into the present disclosure.

STATEMENT REGARDING GOVERNMENT FUNDING

This invention was made with government support under CMMI 1329979 awarded by the National Science Foundation. The government has certain rights in the invention.

TECHNICAL FIELD

The present disclosure generally relates to online data security, and more particularly to secure multi-party data exchange and encryption techniques where partial data can be exchanged by different users in order to perform mathematical operations without any user or $3^{rd}$ party knowing other user's data.

BACKGROUND

This section introduces aspects that may help facilitate a better understanding of the disclosure. Accordingly, these statements are to be read in this light and are not to be understood as admissions about what is or is not prior art.

Risks associated with data sharing, including leakage and misuse by external and internal parties involved in a collaboration, often inhibit the use of sensitive data even though it may benefit the collaboration. Such fears for one's sensitive data could arise for several reasons, including: 1) Security Mismatch: Other collaborators have different security practices that fall short of satisfying the security standards of the data owner (i.e., they are more likely to suffer a break-in or some other data breach); 2) Common Collaborator: A party with a collaborator who collaborates (separately) with a competitor could face a risk of competitive loss as the common collaborator acquires privileged information; 3) Future Competitor: The current collaborator can become a competitor in the future.

In order to avoid such misuse and leakage, several techniques have been developed in the prior art. For example, collaborators can protect themselves from such risks by altering their sensitive data, e.g., by adding noise, prior to sharing. However, such alterations hinder the success of all collaborators. An alternative approach is secure multi-party computation, which makes it possible for collaborators to compute outputs without revealing private inputs and without degradation in the quality of the computed outputs (i.e., it would be of the same quality as if full sharing had taken place). This type of sharing is often referred to as multi-party secure computation techniques.

Examples of multi-party secure computation techniques include 1) Partial Homomorphic Encryption (PHE) and Fully Homomorphic Encryption (FHE)—these encryption techniques use modular exponentiation, which is computationally expensive (complexity that is cubic in the number of bits); 2) Garbled Circuits—A technique which uses Oblivious Transfer (OT), known to a person having ordinary skill in the art which also uses computationally expensive modular exponentiations; and 3) Secret Sharing—a technique where the size of a share increases with the number of collaborators thereby adding significant costs.

The above enumerated approaches use expensive techniques in terms of computation time and in development effort, such as homomorphic encryption and garbled circuit evaluation, to perform the required computations without leaking confidential information. Specifically, with these techniques computations over confidential information are performed using encrypted or encoded data, and most use expensive computational primitives such as modular exponentiation.

These technologies, help collaborators to overcome the "reluctance to share" wherein collaborators can achieve the full benefits of collaboration without revealing confidential inputs. However, as discussed above, each of these techniques suffer from algorithmic and computational costs.

Therefore, there is an unmet need for a novel approach to allow secure multi-party data exchange and encryption where partial data can be exchanged by different users in order to perform mathematical operations without any user or $3^{rd}$ party knowing other user's data.

SUMMARY

A method of performing ordered statistics between at least two parties while maintaining confidentiality of information of each of the at least two parties is disclosed. The method includes identifying a first dataset ($x_A$) by a first node (A) and identifying a second dataset ($x_B$) by a second node (B). $x_B$ is unknown to A and $x_A$ is unknown to B. A is in communication with B. A and B are in communication with a server (S). The method also includes A and B each additively splitting each member of their respective datasets into corresponding shares. Furthermore, the method includes sharing the corresponding shares with one another and arranging the corresponding shares according to a mutually agreed predetermined order into corresponding ordered shares. The method also includes shuffling the ordered shares into shuffled shares, re-splitting the shuffled shares into re-split shuffled shares, and performing an ordered statistical operation on the re-split shuffled shares, wherein the steps of shuffle and re-split is based on additions, subtractions but not multiplication and division.

A computing system architecture is also disclosed. The architecture includes a first node (A) having a first dataset ($x_A$). The architecture also includes a second node (B) having a second dataset ($x_B$). $x_B$ is unknown to A and $x_A$ is unknown to B. A is in communication with B. The architecture also includes a server (S) in communication with A and B. A includes a first processor and B including a second processor. The first and the second processors each having software encoded on a non-transitory computer readable medium configured to: additively split each member of their respective datasets into corresponding shares, share the corresponding shares with one another, arrange the corresponding shares according to a mutually agreed predetermined order into corresponding ordered shares, shuffle the ordered shares into shuffled shares, re-split the shuffled shares into re-split shuffled shares, and perform an ordered statistical operation on the re-split shuffled shares, wherein the steps of shuffle and re-split is based on additions, subtractions but not multiplication and division.

DETAILED DESCRIPTION

Figure 1:
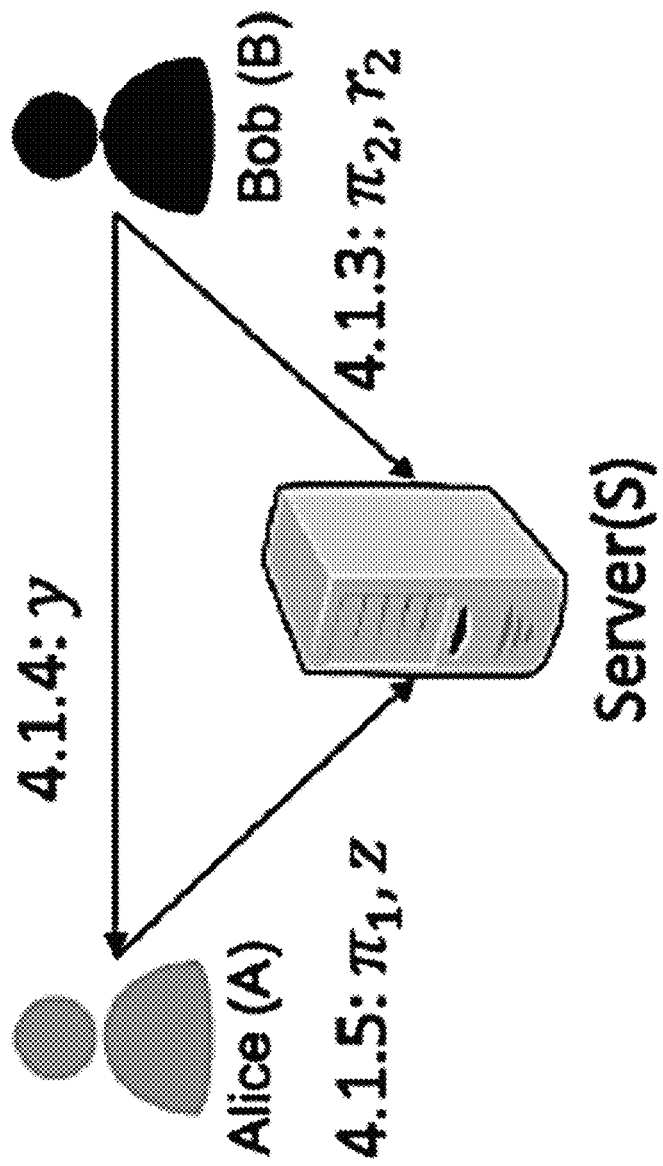
FIG. 1 is a schematic of a connectivity of the system architecture between at least two parties and a server and the data exchanged therebetween.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach to allow secure multi-party data exchange and encryption is presented where partial data can be exchanged by different users in order to perform mathematical operations without any user or 3$^{rd}$ party knowing other user's data. The novel approach of the present disclosure utilizes an additive splits technique along with a data shuffle technique which enables two or more collaborators to shuffle a list of additively split items and simultaneously re-split the items. This novel approach of the present disclosure uses a single server (henceforth denoted by S) to help perform the aforementioned steps. The S learns nothing about the list of items held in additively split form by the two or more collaborators. This approach allows performing computations such as order statistics while preventing one collaborator from learning the inputs of the other collaborator or for S to learn to the data.

For simplicity, while imposing no such limitation, assume there are two collaborators Alice (whose computing device is denoted by A) and Bob (whose computing device is denoted by B), who have confidential data $x_A$ and $x_B$, respectively. The format of confidential data is a set of integers. That is $x_A$ represents one set of integers owned by Alice and $x_B$ represents another set of integers owned by Bob. Alice knows of her own data, and knows nothing of Bob's data; and similarly Bob knows of his own data, and knows nothing of Alice's data. Computing devices of Alice and Bob, Devices A and B, respectively, additively split their respective confidential data using the protocol described in Table 1 and share the result with their counterpart using the protocol described in Table 2. Thereafter, Alice and Bob arrange their inputs using the protocol described in Table 3. The protocols described in Tables 1, 2 and 3 are prerequisites for the shuffle and re-split protocol which is presented next.

The protocol requires random vectors to be generated by Alice and Bob, and the helper server S discussed later. Distribution functions F(·) generate vectors of random integers of required length for the given computation.

TABLE 1

Additively split the inputs

| | |
|---|---|
| Input: | Alice's input is data $x_A$ and distribution function $F_A'$, (.) and Bob's input is data $x_B$ and distribution function $F_B'$(.). |
| Output: | Alice's output is $(x'_A, x''_A)$ and Bob's output is $(x'_B, x''_B)$. |
| 1.1 | A generates a random number $r_A$ from $F_A'$, (.). [represents a distribution function] |
| 1.2 | A splits $x_A$ into $x'_A$ and $x''_A$ such that $x_A = x'_A + x''_A$ For example, $x'_A = x_A - r_A$ and $x''_A = r_A$ |
| 1.3 | B generates a random number $r_B$ from $F_B'$ (.). |
| 1.4 | B splits $x_B$ into $x'_B$ and $x''_B$ such that $x_B = x'_B + x''_B$. For example. $x'_B = x_B - r_B$ and $x''_B = r_B$. |

TABLE 2

Exchange additive shares with the counterpart

| | |
|---|---|
| Input: | A's input is $x''_A$ and B's input is $x'_B$. |
| Output: | A's output is $x'_B$ and B's output is $x''_A$. |
| 2.1 | A → B: $x''_A$ .[notation means: A sends, to B, $x''_A$] |
| 2.2 | B → A : $x'_B$ |

TABLE 3

Arrangement of the additive shares

| | |
|---|---|
| Input: | A's input is $x'_A, x'_B$ and B's input is $x''_A, x''_B$ , |
| Output: | A's output is (x') and W's output is (x"). |
| 3.1 | A arranges the shares received $(x'_A, x'_B)$ in a mutually agreed order (x'). For instance. x' = $x'_A$ ‖$x'_B$ where ‖ denotes concatenation |
| 3.2 | Similarly, B obtains (x") using the same mutually agreed order. |

$x'_A$ is the algebraic difference between $x_A$ and the random number, and $x''_A$ is the random number generated.

Similarly, suppose Bob's set of number is $x_B=\{13,17,5\}$. For each number of the set, a random number generator with a distribution function $F_B^1(\cdot)$ is used to generate a random number. Suppose the random numbers generated are $r_B=\{9, 4,8\}$. Next Bob splits each number in the original set based on the random numbers into shares, $x_B=\{4+9,13+4,-3+8\}$. The split is based on algebraic relationship $x_B=x'_B+x''_B$, where $x_B$ is the original number, $x'_B$ is the algebraic difference between $x_A$ and the random number, and $x''_B$ is the random number generated.

In both cases, $x'_A$, $x''_A$, $x'_B$, and $x''_B$ are additive shares for the original number $x_A$ and $x_B$, respectively.

Next, according to Table 2 Alice and Bob share their additive shares with each other. According to one embodiment, while Alice shares $x''_A$, Bob shares $x'_B$. As a result, based on the example provided, Alice's output (A$_o$) and Bob's input (B$_i$) is {12,1,2} for the original set of $x_A=\{17, 8,6\}$ and Bob's output (B$_o$) and Alice's input (A$_i$) is {4,13,-3} based on the original set of $x_B=\{13,17,5\}$.

Next Alice and Bob arrange the shares each received. In case of Alice, x'=(4,13,-3) and in case of Bob, x"=(12,1,2). Both Alice and Bob rearrange their inputs according to a pre-agreed order (x'). It should be appreciated for this purpose $x'_A$, is considered an input for Alice as well as $x'_B$. For instance, x'=$x'_A$‖$x'_B$, where ‖ denotes concatenation. In this case, $x'_A=(5,7,4)$ and $x'_B=(4,13,-3)$. Thus the rearranged inputs for A is x'=(5,7,4,4,13,−3). Similarly, for Bob's input, the inputs are $x''_A=\{12,1,2\}$ and $x''_B=\{9,4,8\}$. Thus the rearranged input for B is x''=(12,1,2,9,4,8).

Next the values obtained from Table 3 are shuffled. By the end of protocol described in Table 3, A and B have a list of items x' and x'' respectively. The sum of these vectors equals x(=x'+x''); Alice only knows x' (which looks random to her), and Bob only knows x'' (which looks random to him), and the set of values in x is the union of the set of values in $x_A$ and those in $x_B$.

If c is a vector and π is a permutation, the notation π(c) can be used to denote the vector obtained by shuffling the order of the entries of y according to permutation π. For simplicity of notation, π operates on n items where n is the length of the vector y. Also, any random vector generated has same length as x, which is the length of $x_A$ plus the length of $x_B$ (in the running example we are using, that length is 6, the sum of 3 and 3).

Figure 2:
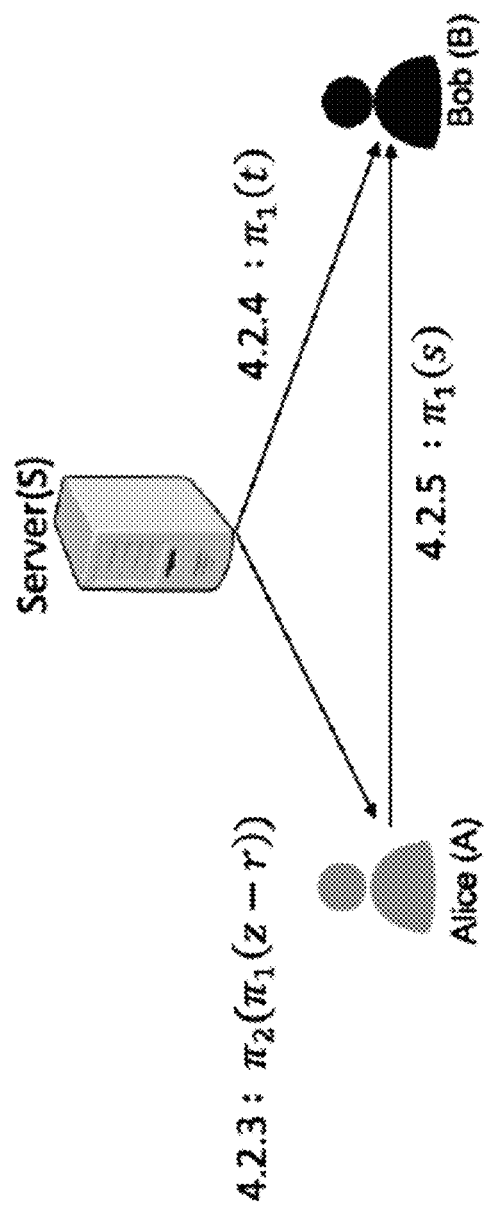
FIG. 2 is a schematic of a connectivity of the system architecture between the at least two parties and the server of FIG. 1, and the data exchanged therebetween

The description of a protocol that enables A and B to securely shuffle and re-split (SRS) x is described in Table 4. This protocol is based on two rounds. In round 1, the helper server S receives the pre-processed data from A and B. At the end of round 2, A and B have the shuffled and re-split of the original list of shares (x=x'−x''). Parts of this SRS protocol are depicted in FIGS. 1 and 2 for better clarity.

The notion of shuffling is based on permutation π. Suppose A's share at the end of Table 3 is being shuffled by π. The shuffle function it has the same length as the share of A out of Table 3 (which is the same length as x, in the above example length is 6). A's share out of Table 3 is (5,7,4,4, 13,−3). Suppose it is (4,2,1,5,3,6). Applying π to A's output of Table 3 results in a reshuffle of A's share as: (4,7,13,5, 4,−3), i.e., the position of the members of the vector is changed based on the values of π. Table 4 provides for reshuffling based on $\pi_1$, π2, and $\pi_3$.

The SRS process shown in Table 4 is now discussed. Table 4 is divided into two parts: Round 1 and Round 2. In Round 1, the list of input shares (x',x'') is pre-processed. In Round 1, Alice (A) generates a random permutation $\pi_1$ from a distribution function $F_A^2(\cdot)$ and a random vector $r_1$ from a distribution function $F_A^3(\cdot)$. Similarly, Bob (B) generates a random permutation $\pi_2$ from a distribution function $F_B^2(\cdot)$ and a random vector $r_2$ from a distribution function $F_B^3(\cdot)$. Therefore, there are now two permutation functions $\pi_1$ (owned by A) and $\pi_2$ (owned by B), and two random vectors $r_1$ (owned by A) and $r_2$ (owned by B). Next B sends to the server S its $\pi_2$ and $r_2$. In addition, B sends to A vector y, where y=x''−$r_2$. In addition, A sends to the server S $\pi_1$ and z, where z=y−$r_1$, which is x''−$r_2$−$r_1$.

Next Round 2 is discussed. A and B generate a permutation function $\pi_3$ from a distribution function $F_{AB}(\cdot)$. The server S generates a random number r from a distribution function $F_S(\cdot)$. At this point, the server S has knowledge of $\pi_2$, $\pi_1$, $r_2$, and z and the newly generated r. S then generates p, where p=z−r. S then applies the permutation function $\pi_1$ to p and then applies the permutation function $\pi_2$ to the resultant (i.e., $\pi_2(\pi_1(z-r))$). The latter is sent to A.

Additionally, S generates t, where t=$r_2$+r. S then applies the permutation function $\pi_1$ to t (i.e., $\pi_1(t)$, where t=$r_2$+r). S then sends the later to B. In turn A sends to B $\pi_1(s)$, where s=x'+$r_1$. At this point, B possesses $\pi_1(t)$ and $\pi_1(s)$. B then generates q, where q=$\pi_1(t+s)$. B then applies $\pi_2$ to q, obtaining $\pi^2(q)$.

Now A applies permutation function $\pi_3$ and $\pi_2$ to her share generating a, where a=$\pi_3(\pi_2(p))$. In other words, a=$\pi_3(\pi_2(\pi_1(x''-r_1-r_2-r)))$. Similarly, B applies permutation function $\pi_3$ and $\pi_2$ to his share generating b, where b=$\pi_3(\pi_2(q))$. In other words, b=$\pi_3(\pi_2(\pi^1(x'+r_1+r_2+r)))$.

One concern about this multi-party data exchange is correctness of the data being exchanged in the SRS approach. The vector to be shuffled and re-split is x'+x''. At the end of stage 2, A's share is $\pi_3(\pi_2(\pi_1(x''-r_1-r_2-r)))$, B's share is $\pi_3(\pi_2(\pi_1(x'+r_1+r_2+r)))$. In other words, A and B have additive shares of $\pi_3(\pi_2(\pi_1(x'+x'')))$. The shuffling was therefore done according to permutation π such that π(x)=$\pi_3(\pi_2(\pi_1(x)))$. Note that none of the participants learns anything about π or about the re-splitting.

Another concern is security of the data being exchanged. S knows the following information during the protocol: $\pi_1$, $\pi_2$, r, $r_2$, and x''−$r_2$−$r_1$. However, it cannot learn anything about the permutation π or the secret x without knowledge of $\pi^3$, $r_1$, and x'. A knows the following information: $\pi_1$, x', $r_1$, x''−$r_2$, $\pi_2(\pi_1(x''-r_2-r_1-r))$, and $\pi_3$. She cannot learn anything about the permutation (π) or the secret x without knowledge of $r_2$, r, and $\pi^2$. Similarly, B cannot learn anything about the permutation π or the secret x without knowledge of r, $r_1$, and $\pi_1$.

TABLE 4

Shuffle and Re-Split (SRS) protocol

| | |
|---|---|
| Input: | A's input is data x' and distribution functions $F_A^2(\cdot).F_A^3(\cdot)$; B's input is data ,x'' and distribution functions .$F_B^2(\cdot), F_B^3(\cdot)$. A and B have a mutually agreed random distribution function $F_{AB}(\cdot)$. Server S's input is distribution function $F_s(\cdot)$ |
| Output: | A's output is a and Bs output is b. |
| | Round 1: Pre-processing of the input shares (x', x'') |
| 4.1.1 | A generates a random permutation $\pi_1$ from $F_A^2(\cdot)$ and a random vector $r_1$ from $F_A^3(\cdot)$ |
| 4.1.2 | B generates a random permutation $\pi_1$ from $F_B^2(\cdot)$ and a random vector $r_2$ from $F_B^3(\cdot)$ |
| 4.1.3 | B → S:$\pi_2, r_2$ |
| 4.1.4 | B → A:y. Where y = x''−$r_2$ |
| 4.1.5 | B → S:π,z. Where z = x''−$r_2$ −$r_1$ |
| | Round 2: Determine the shuffled and re-split version of the, input shares (x', x'') |
| 4.2.1 | A and B generate a permutation $\pi_3$ from FAB(.) |
| 4.2.2 | S generates r from Fs( . ) and adds ....r to z to obtain p = z−r |
| 4.2.3 | S → A : $\pi_2(\pi 1(z-r))$ |
| 4.2.4 | S → B : $\pi_1(t)$, where t = $r_2$ + r. |
| 4.2.5 | A → B: $\pi_1(s)$, where s = x' + $r_1$. |
| 4.2.6 | B adds $\pi_1(t)$ to $\pi_1(s)$, obtaining q = $\pi_1$ (t +S). |
| 4.2.7 | B applies $\pi_2$, to q, obtaining $\pi_2(q)$, |
| 4.2.8 | A permutes her share re4.vived in step (4.2,3), a = $\pi_3(\pi_2(q)) = \pi_3(\pi_2(\pi_1(x''-r_2 -r_1)))$. |
| 4.2.9 | B also permutes his share computed in step (4.2.7). b = $\pi_3(\pi_2(q)) = \pi_3(\pi_2(\pi_1(x''-r_2 -r_1)))$. |

The SRS protocol of the present disclosure is composable and can be integrated with existing shared computing environments such as Sharemind and SAPAS protocols, known to a person having ordinary skill in the art. Such integration can help users efficiently perform sorting and other statistical operations securely.

The existing methods of the prior art use encryption to prevent the leakage of confidential information, and the computations over such confidential information are performed over the encrypted data. In the approach of the present disclosure, these computations are performed using an entirely different method. In these protocols, a single server is utilized to perform the required computations without informing the server of the data owned by A or B. With the present approach, A and B are both able to calculate order statistics such as maximum and minimum, average, and a host of other statistical parameters without either of them knowing the other's data.

The quicksort algorithm, known to a person having ordinary skill in the art, is one of the commonly used algorithms for sorting an array of elements. This algorithm initiates with the selection of a pivot element to sort the array. Oblivious sorting using quicksort requires hiding the pivot element (value and its index) from Alice, Bob and Server. Such hiding makes this algorithm computationally expensive. Application of the SRS protocol overcomes the need to hide the index and thereby reduces the computational load of oblivious sorting using quicksort. In Table 5, the SRS protocol is compared with other protocols known in the prior art. Protocol in Table 6 shows how SRS protocol can be used in Quicksortbased oblivious sorting.

TABLE 5

Complexity of secure shuffle protocols for a 3-party system

| Protocol | Comm. Complexity | Rounds |
|---|---|---|
| Blind and Permute [10] | $O(n^3)$ | 1 |
| Oblivious Protocol 1 [11] | $O(n\log n)$ | 8 |
| Oblivious Protocol 2 [11] | $O(3n^2)$ | 3 |
| Oblivious Protocol 3 [11] | $O(3n^3)$ | $O(\log(3))$ |
| SRS Protocol | 6n | 1 |

TABLE 6

Oblivious Sorting

| Input: | A's input is $,x_a$ and W's input is $x_B$. |
|---|---|
| Output: | A's output is (x') and W's output is (x"), |
| 5.1 | A's input is $x_a$ and B's input is $x_B$, A and B run the protocol in Table 1 to obtain $(x'_A, x''_A)$ and $(x'_B, x''_B)$ respectively |
| 5.2 | A's input is $x'_A$ and B's input is $x'_B$. A and B run the protocol in Table 2 to obtain $(x'_B)$ and $(x''_A)$ respectively |
| 5.3 | A uses $x'_A, x'_B$ and B uses $x''_A, x''_B$ to run the protocol in Table 3 to obtain (x') and (x") spectively |
| 5.4 | A uses is a and B's uses x" to run the protocol in Table 4 and obtain (a) and (b) respectively |
| 5.5 | A's input is a and B's input is b and they jointly run the steps in Quicksort algorihm [12] securely |

Oblivious sorting enables Alice and Bob to search elements including maximum, minimum, mode, and median without needing to reveal their individual confidential data to anyone. In addition, oblivious sorting in multi-dimensions allows Alice and Bob to determine dominant solutions. In matrix factorization, oblivious sorting helps Alice and Bob to find the order of singular values, eigen values. Such computations in an oblivious manner allows Alice and Bob to reduce from high dimensional data to low dimensions.

To continue from the previous examples provided above, suppose prior to using quicksort, Alice's share of the input to the quicksort (i.e., out of Table 4) could possibly be the vector (8,3,−2,7,9,−4) and Bob's the vector (9,2,15,−1,8, 12); note that the sum of these vectors is the vector (17,5, 13,6,17,8) whose set of contents is, as required, the union of {17,8,6} and {13,17,5}, i.e., Alice's set of numbers was {17,8,6} and Bob's was {13,17,5}. To Alice and Bob their respective vectors look random, therefore during the quicksort it is harmless if they both know the index of the pivot elements, and also know the outcomes of individual comparisons. In other words, that knowledge tells Alice (respectively, Bob) nothing if she (he) learns that the third element, for which her (his) share is −2 (15), is greater than the fourth element, for which her (his) share is 7 (−1). This is the benefit of doing the shuffle and resplit before the quicksort: It makes it unnecessary for quicksort to hide from Alice and Bob the pivot elements and the outcomes of pairwise comparisons (if quicksort had to hide these, it would be impractical). To continue with the running example we are using: If Alice's share of the input to the quicksort was (8,3,−2,7,9,−4) and Bob's was (9,2,15,−1,8,12), then the output of the quicksort would result in Alice's share being (3,7,−4,−2,8,9) and Bob's share being (2,−1,12,15,9,8) because the sum of these vectors is sorted: (3,7,−4,−2,8,9)+ (2,−1,12,15,9,8)=(5,6,8,13,17,17).

After the quicksort gives Alice and Bob their respective shares of (3,7,−4,−2,8,9) and (2,−1,12,15,9,8) of the sorted result, they can trivially compute any ordered statistic for the union of their sets of numbers: If for example Bob is supposed to learn the median (i.e., the third smallest element) then Alice would send Bob her share of the third element of the sorted result, which is −4, and Bob would add that −4 to its own share of 12 and learn that the third smallest element is 8.

Those having ordinary skill in the art will recognize that numerous modifications can be made to the specific implementations described above. The implementations should not be limited to the particular limitations described. Other implementations may be possible.

The invention claimed is:

1. A computing system architecture for secure multi-party data exchange and encryption between at least two nodes, comprising:
at least two nodes A and B, A having a dataset $x_A$, and B having a dataset $x_B$, wherein $x_B$ is unknown to A and $x_A$ is unknown to B, and wherein A is in communication with B;
a server (S) in communication with A and B;
A including a processor $\mu_A$ and B including a processor $\mu_B$,
$\mu_A$ and $\mu_B$ each having software encoded on a non-transitory computer readable medium configured to:
additively modify a corresponding dataset by a pre-defined function,
define shares of the modified dataset,
share one or more shares of the modified dataset with one another,
arrange corresponding shared shares according to a mutually agreed predetermined order into corresponding modified shares;
re-split the corresponding modified shares into re-split ordered shares; and
perform an ordered statistical operation on the re-split ordered shares, wherein the step of re-split is based on additions, subtractions but not multiplication and division.

2. The computing system architecture of claim 1, wherein additive modification of each dataset includes:
generate a random number associated therewith, and
split each member of the corresponding dataset as an algebraic sum of the associated random number and an associated remainder.

3. The computing system architecture of claim 2, wherein the step of sharing the one or more shares of the modified dataset with one another includes:

a first processor of the at least two nodes A and B communicating the random number associated with each member of the corresponding dataset generated to a second processor of the at least two nodes A and B, and the second processor of the at least two nodes A and B communicating the remainder associated with each member of the corresponding dataset to the first processor of the at least two nodes A and B.

4. The computing system architecture of claim 1, wherein the mutually agreed predetermined order includes concatenation.

5. The computing system architecture of claim 4, wherein the concatenation includes:

a first processor of the at least two nodes A and B concatenating remainders of the first dataset with remainders communicated by a second processor of the at least two nodes A and B, thereby generating a first ordered sequence of shares, and the second processor of the at least two nodes A and B concatenating the remainders communicated by the first processor with the remainders of the second dataset, thereby generating a second ordered sequence of shares.

6. The computing system architecture of claim 1, wherein each processor of the at least two nodes A and B prior to re-splitting the corresponding modified shares further configured to:

shuffle the ordered shares into shuffled shares after establishing the ordered shares;

wherein the step of shuffling the ordered shares includes:

a first processor of the at least two nodes A and B generates a random first permutation $\pi_1$ and a random vector $r_1$;

a second processor of the at least two nodes A and B generates a random second permutation $\pi_2$ and a random vector $r_2$;

the second processor of the at least two nodes A and B communicates $\pi_2$ and $r_2$ to S;

the second processor of the at least two nodes A and B communicates to the first processor of the at least two nodes A and B an algebraic sum of the random number associated with y=x and $-r_2$; and the first processor of the at least two nodes A and B communicates to S $\pi_1$ and the algebraic sum of z=y $-r_1$, thereby generating shuffled shares as modified shares.

7. The computing system architecture of claim 1, wherein the step of re-splitting modified shares includes:

a first processor of the at least two nodes A and B and a second processor of the at least two nodes A and B each generates a common random third permutation $\pi_3$;

S generates a random vector r and calculates an algebraic sum of p=z−r;

S communicates to A of the at least two nodes A and B the second permutation of first permutation of p ($\pi_2(\pi_1(p))$);

S calculates an algebraic sum of t=$r_2$+r;

S communicates to B of the at least two nodes A and B the first permutation of $\pi_1(t)$;

the first processor of the at least two nodes A and B calculates an algebraic sum s=x'+$r_1$;

the first processor of the at least two nodes A and B communicates to B the first permutation of $\pi_1(t)$;

the second processor of the at least two nodes A and B calculates an algebraic sum of q=$\pi_1(t)+\pi_1(t+s)$);

the second processor of the at least two nodes A and B applies the second permutation $\pi_2(q)$;

the first processor of the at least two nodes A and B applies the third permutation to the second permutation of p and outputs $\pi_3(\pi_2(p))$; and the second processor of the at least two nodes A and B applies the third permutation to the second permutation of q and outputs $\pi_3(\pi_2(q))$.

8. The computing system architecture of claim 1, the ordered statistical operation is a sorting operation.

9. The computing system architecture of claim 8, the sorting is an oblivious sorting operation.

10. The computing system architecture of claim 1, where each of A and B of the at least two nodes A and B adapted to share mutually agreed results of the ordered statistical operation with one-another.

11. A method for secure multi-party data exchange and encryption between at least two nodes, comprising:

additively modifying a corresponding dataset $x_A$ held by a first node A of at least two nodes by a first predefined function by a first processor $\mu_A$ having software encoded on a first non-transitory computer readable medium;

additively modifying a corresponding dataset $x_B$ held by a second node B of the at least two nodes by a second predefined function by a second processor $\mu_B$ having software encoded on a second non-transitory computer readable medium, wherein $x_B$ is unknown to A and $x_A$ is unknown to B, and wherein A is in communication with B and each is communication with a server (S);

defining shares of each of the modified datasets, sharing one or more shares of each of the modified dataset between the two or more nodes, arranging each of the corresponding shared shares according to a mutually agreed predetermined order into corresponding modified shares;

re-splitting each of the corresponding modified shares into re-split ordered shares; and performing an ordered statistical operation on each of the re-split ordered shares, wherein the step of re-splitting is based on additions, subtractions but not multiplication and division.

12. The method of claim 11, wherein additive modification of each dataset includes:

generating a random number associated therewith, and splitting each member of the corresponding dataset as an algebraic sum of the associated random number and an associated remainder.

13. The method of claim 12, wherein the step of sharing the one or more shares of the modified dataset with one another includes:

a first processor of the at least two nodes communicating the random number associated with each member of the corresponding dataset generated to a second processor of the at least two nodes, and the second processor of the at least two nodes communicating the remainder associated with each member of the corresponding dataset to the first processor of the at least two nodes.

14. The method of claim 11, wherein the mutually agreed predetermined order includes concatenation.

15. The method of claim 14, wherein the concatenation includes:

a first processor of the at least two nodes concatenating remainders of the first dataset with remainders communicated by a second processor of the at least two nodes, thereby generating a first ordered sequence of shares, and the second processor of the at least two nodes concatenating the remainders communicated by the first processor with the remainders of the second dataset, thereby generating a second ordered sequence of shares.

16. The method of claim 11, wherein prior to re-splitting the corresponding modified shares further comprising:
shuffling the ordered shares into shuffled shares after establishing the ordered shares;
wherein the step of shuffling the ordered shares includes:
a first processor of the at least two nodes generating a random first permutation $\pi_1$ and a random vector $r_1$;
a second processor of the at least two nodes generating a random second permutation $\pi_2$ and a random vector $r_2$;
the second processor of the at least two nodes communicating $\pi_2$ and $r_2$ to S;
the second processor of the at least two nodes communicating to the first processor of the at least two nodes an algebraic sum of the random number associated with $y=x$ and $-r_2$; and
the first processor of the at least two nodes communicates to S $\pi_1$ and the algebraic sum of $z=y-r_1$, thereby generating shuffled shares as modified shares.

17. The method of claim 11, wherein the step of re-splitting modified shares includes:
a first processor of the at least two nodes and a second processor of the at least two nodes each generating a common random third permutation $\pi_3$;
S generating a random vector r and calculates an algebraic sum of $p=z-r$;
S communicating to A of the at least two nodes the second permutation of first permutation of p ($\pi_2(\pi_1(p))$);
S calculating an algebraic sum of $t=r_2+r$;
S communicating to B of the at least two nodes the first permutation of $\pi_1(t)$;
the first processor of the at least two nodes calculating an algebraic sum $s=x'+r_1$;
the first processor of the at least two nodes communicating to B the first permutation of $\pi_1(t)$;
the second processor of the at least two nodes calculating an algebraic sum of $q=\pi_1(t)+\pi_1(s)=\pi_1(t+s)$);
the second processor of the at least two nodes applying the second permutation $\pi_2(q)$;
the first processor of the at least two nodes applying the third permutation to the second permutation of p and outputs $\pi_3(\pi_2(p))$; and
the second processor of the at least two nodes applying the third permutation to the second permutation of q and outputs $\pi_3(\pi_2(q))$.

18. The method of claim 11, the ordered statistical operation is a sorting operation.

19. The method of claim 18, the sorting is an oblivious sorting operation.

20. The method of claim 11, where each of the at least two nodes adapted to share mutually agreed results of the ordered statistical operation with one-another.

* * * * *